United States Patent [19]

Rabatin

[11] Patent Number: 4,891,527

[45] Date of Patent: Jan. 2, 1990

[54] SPHERICAL PHOSPHOR AGGREGATES, THEIR PREPARATION AND USE IN X-RAY SCREENS

[75] Inventor: Jacob G. Rabatin, Montville, Ohio

[73] Assignee: General Electric Company, Schenectady, N.Y.

[21] Appl. No.: 230,227

[22] Filed: Aug. 9, 1988

[51] Int. Cl.$^4$ .............................................. G03C 5/17
[52] U.S. Cl. ............................ 250/483.1; 250/487.1; 250/486.1
[58] Field of Search ................... 250/483.1, 484.1 A, 250/484.1 B, 487.1, 486.1; 252/301, 4 H; 378/185

[56] References Cited

U.S. PATENT DOCUMENTS

| | | | |
|---|---|---|---|
| 3,795,814 | 3/1974 | Rabatin | 250/483.1 |
| 3,936,644 | 2/1976 | Rabatin | 250/487.1 |
| 4,315,979 | 2/1982 | Brines et al. | 250/483.1 |
| 4,316,092 | 2/1982 | Rabatin | 250/483.1 |
| 4,481,416 | 11/1984 | Rabatin | 250/327.2 |

Primary Examiner—Janice A. Howell
Assistant Examiner—Richard Hanig
Attorney, Agent, or Firm—Corcoran Edward M.; Stanley C. Corwin; Fred Jacob

[57] ABSTRACT

Radiographic screens of reduced quantum noise are prepared from spherical aggregates of randomly oriented plate shaped or needle shaped phosphor particles. These spherical aggregates are produced by spray drying a slurry of the phosphor particles dispersed in a liquid medium in which is dissolved a suitable binder.

26 Claims, 3 Drawing Sheets

SPHERICAL PHOSPHOR AGGREGATES, THEIR PREPARATION AND USE IN X-RAY SCREENS

BACKGROUND OF THE INVENTION

1. Field of the Invention

This invention relates to spherical phosphor aggregates, their preparation and their use in X-ray screens. More particularly, this invention relates to spherical aggregates of needle or plate shaped phosphor particles produced by spray drying a slurry of said particles and a binder and the use of such aggregates in radiographic imaging systems.

2. Background of the Disclosure

The use of phosphors for radiographic imaging systems is old and well known to those skilled in the art. One type of X-ray imaging system presently used employs an X-ray screen construction of the type disclosed in U.S. Pat. No. 4,316,092 wherein a photographic film employing a light sensitive emulsion on both sides of the film is placed between two X-ray screens, each of which contains a suitable phosphor. A patient or other object to be X-rayed is placed between the film-containing X-ray screen cassette and a source of X-rays. The X-rays penetrate the object being X-rayed and strike the phosphor particles in the screen. This causes the phosphor to emit radiation in the visible and/or UV spectrum which strikes the photographic film which, when developed, yields the desired image.

Other types of X-ray imaging systems include various latent image recallable radiographic imaging systems employing a photoluminescent or thermoluminescent phosphor medium to store a latent image produced therein from exposure to high energy radiation, such as X-rays and the like. In medical radiographic applications, X-rays from a suitable X-ray source are passed through the patient and impinge upon the phosphor medium to produce an immediate first light image which may, if desired, be recorded on photographic film. A recallable, latent image is also produced in the phosphor and remains in the phosphor medium until recalled by the application of a suitable energy source such as a laser. This stimulates the phosphor thereby producing a second light image by thermoluminescent response or photoluminescent response.

U.S. Pat. No. 3,996,472 discloses a phosphor useful in radiation dosimeters which exhibits thermoluminescent response when subjected to heat stimulation. U.S. Pat. Nos. 4,346,295 and 4,356,398 disclose light emitting laser means as the source of stimulating energy to produce a photoluminescent response in various phosphor materials. U.S. Pat. No. 4,481,416 discloses a radiographic imaging system which utilizes a thermoluminescent phosphor layer in combination with a laser stimulated read-out system to generate the energy for exciting the phosphor in order to produce the final desired light image from the latent image stored in the phosphor. A moving laser beam scans the phosphor medium to activate the phosphor to produce the visible light which is then read by a suitable scanning device.

The ideal phosphor particle should be in the form of a perfect sphere in order to minimize cross-talk and light piping parallel to the film. Unfortunately some useful phosphors, such as lanthanum oxybromides, are in the form of needle or plate shaped crystalline particles wherein one dimension is significantly larger than one or more of the other dimensions. In the preparation of X-ray and other radiographic imaging screens, a phosphor is slurried in a liquid medium having a suitable binder material dissolved in the liquid and the slurry is applied as a coating to a suitable base or substrate, such as a film or sheet of polyester (i.e., Mylar), by use of a draw-down or other doctor blade technique in order to achieve a uniform coating of the phosphor on the substrate. This causes the plate and needle shaped phosphor particles to line up in a direction such that the largest dimension is parallel to the longitudinal direction of the substrate. This type of alignment with such phosphor particles results in the worst light piping and scattering problems that one can achieve with them, and also creates substantial reflection problems.

One such attempt to overcome this alignment problem is disclosed in U.S. Pat. No. 4,498,008 where various irregularly shaped doctor blades are employed, along with a sinusuidal movement of the blade, to reduce particle alignment in at least one direction. Other attempts have been directed towards trying to form such inherently needle or plate shaped phosphor particles more in the form of polyhedral or square shaped particles, as is disclosed in U.S. Pat. No. 4,315,979.

U.S. Pat. No. 4,315,979 relates to rare earth oxyhalide phosphors of improved brightness, wherein the plate-shaped phosphor particles have a length to thickness ratio (also known as the aspect ratio) no greater than about 10 to 1. These phosphors exhibit less light scattering and absorption by reason of the more polyhedral crystalline characteristics, in comparison with the same phosphors having aspect ratios which often exceed 15 to 1. U.S. Pat. No. 4,316,092 discloses an X-ray screen containing a mixture of two different rare earth phosphors useful for green or blue-sensitive radiographic films. One of the phosphors is a plate-shaped, thulium activated lanthanum oxyhalide and the other is a polyhedral-shaped, lanthanum and gadolinium oxysulfide activated with terbium. The plate-like phosphor particles in the mixture are more randomly oriented in the phosphor layers due to the presence of the generally larger size and polyhedral-shaped oxysulfide phosphor particles.

The most ideal situation for X-ray or other radiographic screens employing needle or plate shaped phosphor particles would be one wherein the needle or plate shaped particles are aligned in a manner such that the largest dimension of each phosphor particle is perpendicular to the longitudinal direction of the substrate, such as the teeth of a comb. It has not yet been possible to achieve this result. Accordingly a need still exists for improved radiographic screens employing needle or plate shaped phosphor particles.

SUMMARY OF THE INVENTION

It has now been discovered that radiographic screens of substantially reduced quantum nose can be produced from plate or needle shaped phosphor particles if the phosphor particles are in the form of spherical aggregates in which the plate or needle shaped phosphor particles are oriented or aligned in a generally random fashion. Accordingly, the present invention relates to spherical aggregates of randomly oriented plate or needle shaped phosphor particles, their preparation and their use in radiographic screens. These spherical aggregates are produced by spray drying a slurry comprising a mixture of the phosphor particles and a binder material in a suitable liquid medium. Thus, the present invention also relates to a process for achieving spherical aggregates of randomly oriented plate or needle shaped phosphor particles or other similarly shaped particles.

By needle or plate shaped phosphor particles is meant phosphor particles having an aspect ratio greater than 1 to 1, preferably greater than 2 to 1 and still more preferably greater than 5 to 1. Those skilled in the art know that by particles having an aspect ratio of greater than 1 to 1 is meant that the ratio of at least one dimension to another dimension of the particle is greater than 1. X-ray screens containing spherical aggregates of randomly oriented, thulium activated lanthanum oxybromide phosphor particles having aspect ratios ranging between 1.5–8.0 were found to have about 25% less quantum mottle than similar screens having the same phosphor particles, but which were not in the form of the randomly oriented spherical aggregates.

DETAILED DESCRIPTION

Figure 1:
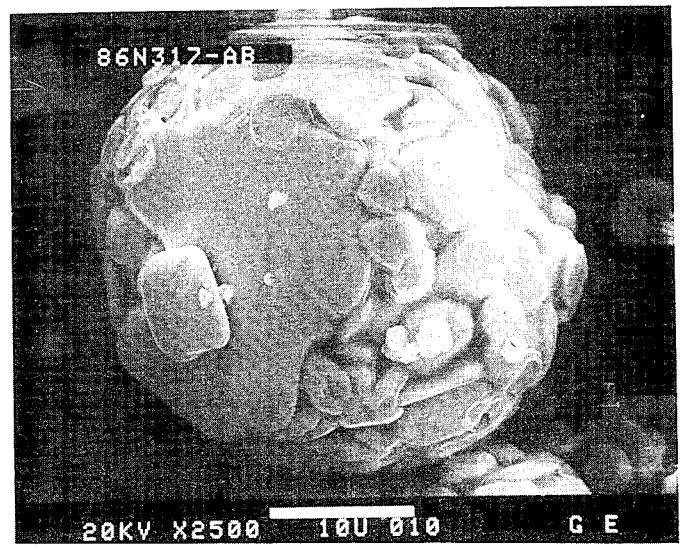
FIG. 1 is a 2500X scanning electron micrograph of a single spherical aggregate of plate shaped particles of a thulium activated oxybromide phosphor made by a spray drying process according to the present invention.

As set forth above, the present invention relates to spherical aggregates of randomly oriented, plate shaped or needle shaped phosphor particles, their preparation in use in radiographic imaging screens and systems. However, it is not intended to limit the present invention to radiographic imaging systems. Another potential application of this invention would be for image intensifier tubes presently using cesium iodide. Illustrative, but not-limiting examples of phosphors suitable for use with the present invention include lanthanum oxybromide phosphors, recrystallized europium activated barium fluor-chloride phosphors, cesium iodide and the like.

The spherical aggregates are produced in a facile manner by spray drying a slurry of the phosphor particles in a suitable liquid medium containing a binder material dissolved therein. In spray drying the slurry, the slurry of phosphor particles is atomized into droplets and the liquid evaporated, thereby forming the spherical aggregates of randomly oriented phosphor particles which are held together by the binder. The needle shaped and/or plate shaped phosphor particles become randomly oriented as a consequence of the flow and atomization of the slurry. As a further embodiment of the present invention, the spherical aggregates may comprise a mixture of one or more randomly oriented plate or needle shaped particles and one or more polyhedral shaped particles formed by spray drying a suitable slurry of such particles.

In many cases it will be advantageous to employ water and/or other highly polar, water miscible liquid as the suspension medium in conjunction with a water soluble binder material. This will enable the use of a less polar or non-polar organic solvent/binder medium for applying one or more layers of the so-produced spherical aggregates to a substrate, such as Mylar sheet, without dissolving the water soluble binder holding the spherical aggregates together. Alternatively, if desired, one may use the reverse system wherein the plate shaped or needle shaped phosphor particles are dispersed in a relatively non-polar, water immiscible solvent, such as a typical non-polar organic solvent, containing a suitable binder material dissolved therein, to form the spherical aggregates by the spray drying process. The so-formed aggregates will then be applied to a suitable substrate employing a relatively high polarity medium, such as water or a water-miscible solvent, containing a suitable, highly polar, water soluble or miscible binder, so that the less polar binder system used in the formation of the spherical aggregates does not dissolve and thereby destroy the integrity of the spherical aggregates when they are applied to a substrate.

Illustrative, but non-limiting examples of highly polar, thermoplastic binder materials that are water soluble and which have been successfully used as a binder for the spherical aggregates of the present invention include carboxy methyl cellulose, polyvinyl alcohol, polyethylene oxide and water soluble acrylic resins such as poly (acrylic acid), poly (methacrylic acid) and poly (sodium methacrylate).

The binder employed in the formation of the spherical phosphor aggregates, whether polar or non-polar, water soluble or water insoluble, may, if desired, be a reactive binder material in either monomer or prepolymer form and need not be one of the commonly used thermoplastic polymer binders presently used by industry in the construction of X-ray and other radiographic screens. Thus, the binder may be a monomeric or prepolymeric thermosetting material curable by heat and/or other radiation with or without the presence of a suitable catalytic material which would not subsequently interfere with the use of the aggregates in an X-ray or other radiographic screen.

FIG. 1 is a scanning electron micrograph taken at a magnification of 2500X of a single spherical aggregate of randomly oriented plate shaped particles of a thulium activated lanthanum oxybromide phosphor according to the present invention which was made by a simple spray drying process. The random, spherulized orientation of the individual plate shaped phosphor particles can readily be seen. In this particular photograph, one extremely large phosphor particle appears on the surface of the spherical aggregate. The diameter of this particular spherical aggregate is about 30 microns. The average, median particle diameter of the phosphor particles employed to make this particular aggregate was 4 microns as measured on a Coulter Counter. The aspect ratio of the individual phosphor particles ranged between about 1.5–8.0. The binder was polyethylene oxide and the preparation of this aggregate will be discussed in greater detail in the Examples below.

Figure 2:
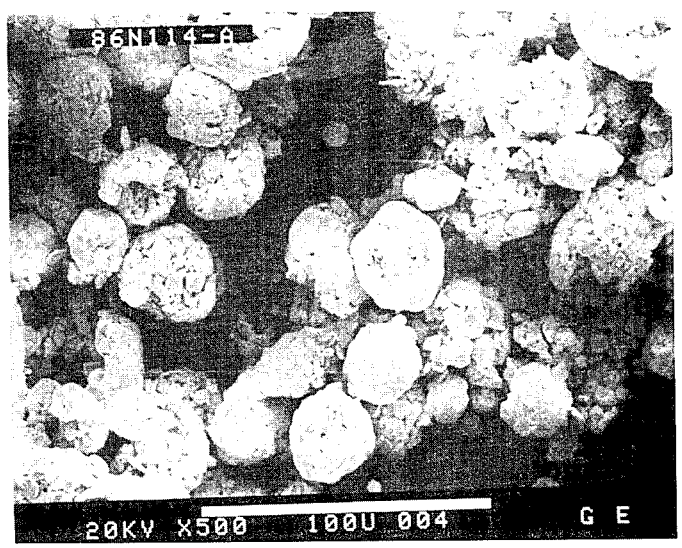
FIG. 2 is a 500X scanning electron microscope of a number of aggregates similar to that shown in FIG. 1.

FIG. 2 is a scanning electron micrograph of a cluster of spherical aggregates of the same type and composition shown in FIG. 1 having diameters ranging from about 10 to about 70 microns. Again, the generally spherical shape is readily apparent as are some of the individual phosphor particles making up each spherical aggregate.

Figure 3:
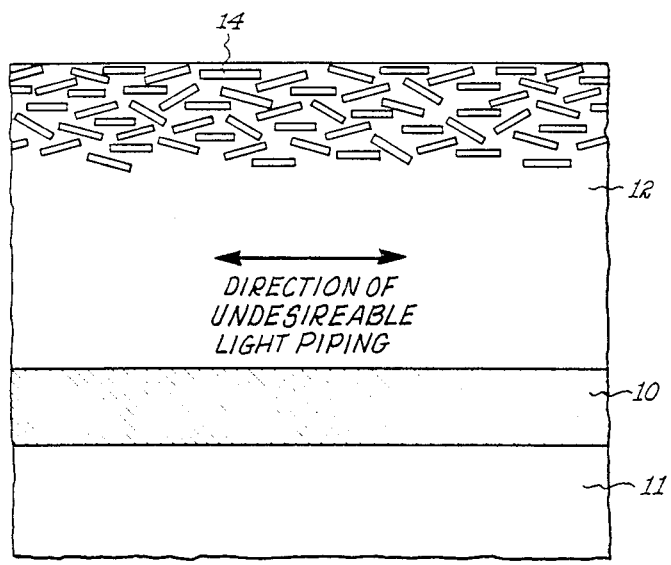
FIG. 3 illustrates the undesirable orientation of plate or needle shaped phosphor particles in an X-ray screen construction typical of the prior art.

FIG. 3 illustrates a partial view of an X-ray screen construction comprising UV reflector layer 10 on substrate 11 over which has been applied phosphor layer 12 containing individual phosphor particles 14. The reflector layer is generally comprised of a suitable UV reflecting material such as MgO, BaSO$_4$, and the like. Phosphor layer 12 contains phosphor particles 14 in the form of platelets, with the long direction oriented parallel to the direction of reflector layer 10 and, concomitantly, parallel to the longitudinal direction of substrate 11. The phosphor particles roughly illustrated here are plate shaped particles of thulium activated lanthanum oxybromide having an average size in the longest dimension of 15–20 microns and an average thickness of 2–3 microns. This results in an aspect ratio for phosphor particles of from about 5–10. When the phosphor particles are lined up in such a fashion, one obtains undesirable light piping along the long dimension of the crystals which means that the image areas produced by the X-ray are less sharply defined and more diffuse due to the light piping or broadening effect of the crystal orientation. This type of orientation can occur as a result of a doctor blade or draw down application of a slurry of such phosphor particles.

Figure 4:
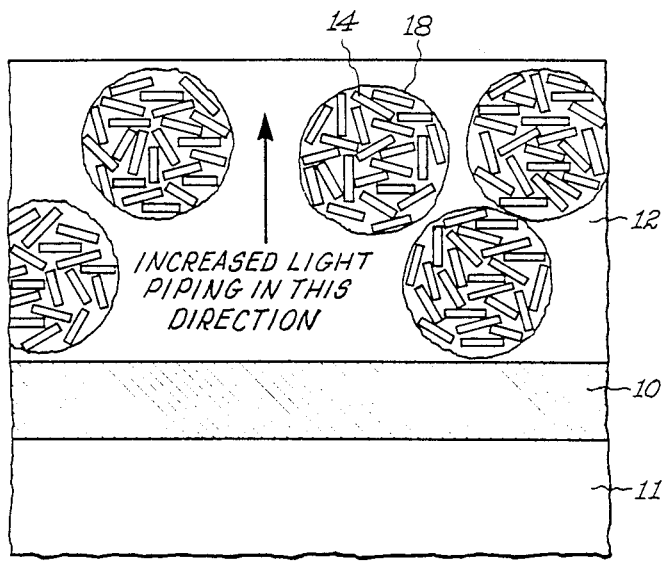
FIG. 4 illustrates an X-ray screen construction employing spherical aggregates of randomly oriented plate shaped or needle shaped phosphor particles according to the present invention.

In marked contrast to the X-ray screen construction depicted in FIG. 3, FIG. 4 roughly depicts a partial X-ray screen construction employing the present invention. In this illustration, the plate like phosphor particles 14 of FIG. 3 are randomly oriented as spherical aggregates 18 having average diameters up to about 70 microns, which results in increased light piping in a direction perpendicular to reflector layer 10 and a reduction in light piping in a direction parallel to reflector layer 10. This results in a sharper image.

Figure 5:
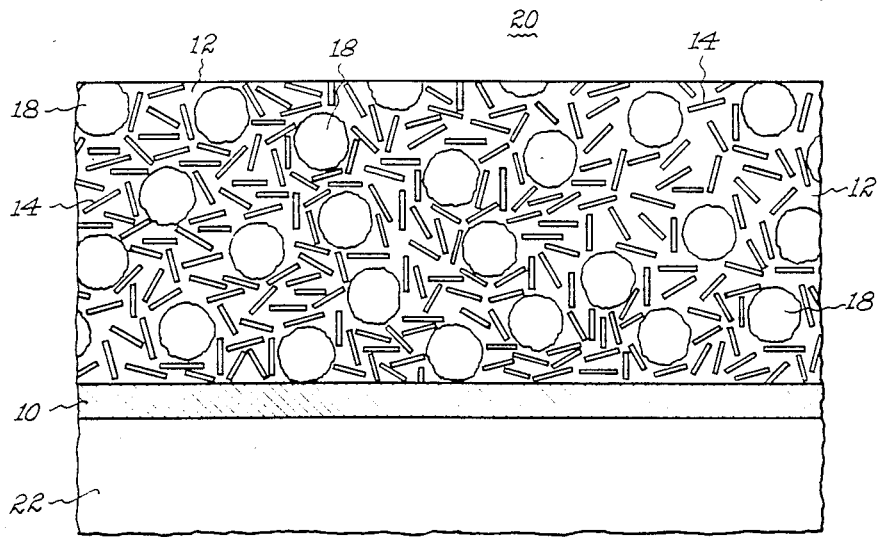
FIG. 5 illustrates an X-ray screen construction wherein the phosphor layer comprises spherical aggregates of randomly oriented plate or needle shaped phosphor particles mixed with non-aggregated plate or needle shaped phosphor particles.

FIG. 5 depicts in cross section a typical X-ray screen member 20 which includes a flexible Mylar backing 22 on which is deposited an ultraviolet and visible light reflecting layer 10 to which is adhesively bonded a single phosphor layer 12. Layer 12 contains a mixture of phosphors comprising (i) spherical phosphor aggregates 18 of the present invention mixed with or dispersed in (ii) plate or needle shaped phosphor particles 14. Phosphor particles 14 can be the same phosphor particles employed in spherical aggregates 18 or they may be different. Moreover, the spherical aggregates 18 may be comprised of an aggregate of a single type of phosphor or a mixture of different types of phosphors. A benefit obtained employing the embodiment of FIG. 5 is that the mixture of spherical aggregates and plate or needle shaped crystals helps to orient more of the non-aggregated needle or plate shaped crystals in a direction perpendicular to the longitudinal axis of the screen member 20 than would otherwise be obtained if the spherical aggregates were not present. This embodiment reduces internal light scattering within the phosphor medium and further provides a desirable light piping effect, which improves transmission to the detector of both visible and UV emission within the medium. This enhances the sharpness of the initial light image produced by the X-ray. It also enhances the sharpness of the retrieved light image, in the case of photoluminescent or thermoluminescent phosphors, when read by an appropriate, operatively associated photo or thermostimulation means such as a laser (not shown) which is commonly employed for such purpose in a latent image recallable radiographic imaging system. This is a result of the emission path length through the phosphor medium being shorter than that which would be provided by a parallel alignment of the plate shaped or needle shaped, non-aggregated phosphor particles with respect to the longitudinal axis of the screen member.

Figure 6:
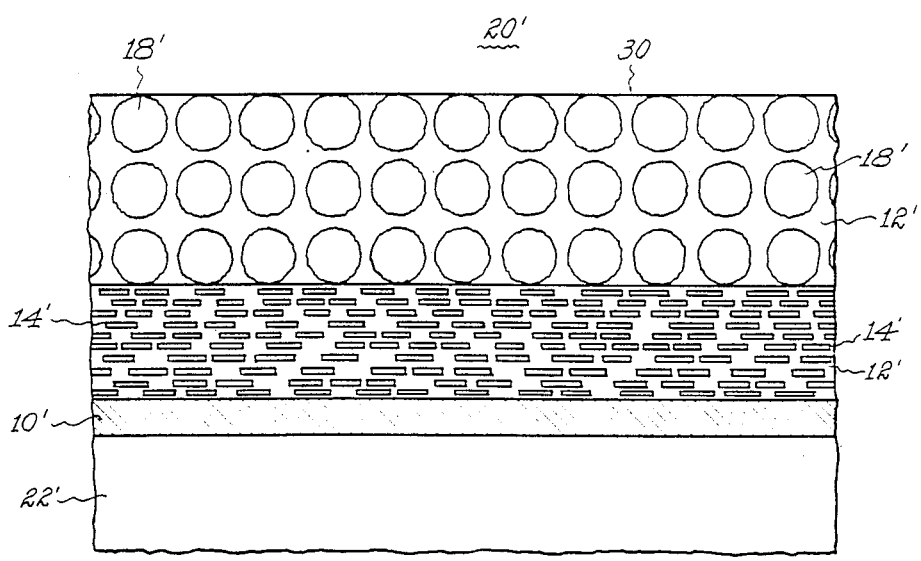
FIG. 6 illustrates an X-ray screen construction comprising (i) a base layer of plate or needle shaped phosphor particles aligned with their longest dimension parallel to the longitudinal dimension of the substrate, said base layer supporting (ii) a layer of spherical aggregates of randomly oriented, plate shaped and/or needle shaped phosphor particles of the present invention.

FIG. 6 shows yet another X-ray screen member employing the spherical phosphor aggregates of the present invention. In this construction, screen member 20' includes a Mylar base layer support 22' on which is deposited a UV and visible light reflecting layer 10, with a dual phosphor layer 30 being adhesively bonded to the top surface of the reflector layer. The uppermost phosphor layer 12' comprises the spherical aggregates 18 of randomly oriented plate shaped or needle shaped phosphor particles. The adjacent and underlying phosphor layer 12 contains plate shaped or needle shaped phosphor particles 14' aligned in a direction with the longest dimension parallel to base 22'. In this construction, the phosphor layer 12' which is first contacted by the X-ray (or a laser readout beam) exhibits a relatively higher transparency to the X-ray or laser beam energy for deeper penetration, with the lower phosphor layer 12 reflecting the unabsorbed energy back into the upper phosphor layer 12'. This produces a brighter, but less sharp image compared to the X-ray screen of FIG. 5.

The invention will be further understood by reference to the examples below.

EXAMPLES

In the following examples, the phosphor employed was a thulium activated lanthanum oxybromide phosphor having the formula LaOBrTm$_{.003}$. This phosphor was made using the following procedure. 1828 grams of La$_2$O$_3$:.003Tm$_2$ were thoroughly blended using a V-cone blender with an intensifier bar with 70 grams of Li$_2$CO$_3$, 50 grams of K$_2$CO$_3$ and 1670 grams of NH$_4$Br. The blend of phosphor and flux was then fired for two and one half hours in a covered dish at 400° C. At this stage the products were a mixture of lanthanum oxybromide, lanthanum tribromide, potassium bromide and lithium bromide. After re-blending, the blend was re-fired at 800° C. in a covered dish for two and one-half hours. The cooled cake was then crushed and washed free of soluble salts (LaBr$_3$, KBr and LiBr). The final product was then dried and sifted for final use.

Example 1

In this example, a plate shaped, thulium activated lanthanum oxybromide having the composition LaOBr.003Tm was prepared using the procedure set forth above, having an average size in the greatest length of 15–20 microns and a thickness of 2–3 microns. Coulter Counter measurements revealed an average particle diameter of about 4 microns. A slurry was prepared containing 100 grams of the phosphor, 1 gram of potassium antimony tartarate, 2 grams of Union Carbide's WSRM-3000 Polyox, which is a water soluble polyethylene oxide resin used as a binder, in 400 ml of water. The viscosity of the slurry was 30 cps at 20° C. The potassium antimony tartarate was used as a phosphor stabilizing agent as disclosed and claimed in U.S. Pat. No. 4,208,470. This slurry was spray dried into spherical aggregates of phosphor and binder using a Yamato Spray Dryer Model DL-41, which is a simple spray dryer wherein the slurry was heated and fed to the top of the dryer wherein it was atomized in a downflow mode with warm air passing upward to dry the atomized, spherulized phosphor slurry aggregates into dry spherical aggregates of the phosphor particles. The conditions were as follows: Inlet slurry temperature of 230° C.; outlet temperature of 90° C., atomizing air rate of 2.0 Kg/cm; drying air rate of 0.73 M³/min., and with an asperating rate of about 200 ml/hr. The model DL-41 has a diameter and length of about 3 ft. and 4 ft., respectively.

Additional runs were made similar to the above, but using a water soluble methyl cellulose resin as the binder instead of the polyethylene oxide. The slurry formulation and spray conditions were identical to the above except for substitution of the binder. The methyl cellulose resin used was CMC-7M manufactured by Hercules.

A number of spray drying runs were made and both petrographic and SEM examinations were made of the resulting spray dried aggregates. Some of the results are shown in the Figures. FIG. 2 shows an SEM picture of aggregates made using WSRN-3000 polyox as the binder. The aggregates vary from about 10 to 70 microns in diameter. FIG. 1 (using the Hercules' CMC-7M water binder) shows a SEM of a spherical aggregate having a diameter of about 30 microns. One can readily see that the individual phosphor particles are more or less in random orientation, with one very large particle on the surface. In all cases, the phosphor particles used to make the aggregates had a Coulter Counter median diameter of about 4 microns. In some runs, up to about 10% of the particles did not form aggregates. The spray drying conditions may have been the primary cause.

The aggregates did not fall apart when slurried in various organic binders such as methanol, acetone, butyl acetate, MEK and MIBK. Also, there appeared to be no swelling or other indication that the water soluble binder interacted with the organic solvents normally used to make X-ray screens.

Example 2

This experiment was similar to Example 1, except that the binder resin used to form the spherical aggregates was a water soluble polyvinyl alcohol PVA-205 obtained from Hercules. In this experiment 400 grams of the thulium activated lanthanum oxybromide phosphor particles and 4 grams of potassium antimony tartarate powder were slurried in 200 ml of water. In a separate container 20 grams of the PVA-205 were dissolved in 200 ml of water and the resulting solution added to the slurry for a final viscosity of about 90–120 centipoise 20° C.

The Yamato Spray Dryer was set at a 200° C. inlet temperature and an outlet temperature of 100° C. The feed rate of the slurry through the air atomizer was about 6 ml per minute with 1.5 kg per cm² of atomizing air and drying air flow rate of about 1.0 M³ per minute.

Examination of the phosphor aggregates produced in this experiment showed them to be similar to those produced in example 1 in size, shape, orientation and particle size distribution.

Example 3

This example provides coating formulations employing the spherical aggregates of randomly oriented plate shaped or needle shaped phosphor particles of the present invention useful in producing X-ray screens for use in X-ray screen cassettes. One formulation is as follows in parts by weight.

| Parts by Weight | Ingredient |
| --- | --- |
| 260 | thulium activated lanthanum oxybromide spherical aggregates having a diameter of from about 10 to 70 microns. |
| 5 | tributyl phthalate plasticizer. |
| ½ | dispersant (i.e., Gafac RM 710 from GAF Corp.) |
| 15 | DuPont Elvacite 2044 ketone soluble acrylic resin. |
| 40 | MEK |
| 40 | MIBK |

All of the above ingredients, except for the acrylic resins, are premilled together for about one hour in a jar mill or other suitable means which will not break up the phosphor aggregates. A one quart glass jar was used in the laboratory. Then the acrylic resins are added and rolling or mixing is continued for about three hours. After this the viscosity of the resulting slurry or aggregate dispersion is adjusted, if necessary, to about 2000 cp at 20° C. by solvent addition.

Another formulation, prepared in the same manner is:

| Parts by Weight | Ingredient |
| --- | --- |
| 400 | spherical phosphor aggregates |
| 9 | tributyl phthalate |
| ½ | Zonyl FSP dispersant from DuPont. |
| 46 | Union Carbide XYHL polyvinyl butyral resin. |
| 100 | MEK |
| 115 | MIBK |

Example 4

In making X-ray film, Mylar sheet containing a layer of UV and visible reflecting material, such as a film of anatase titania about 25 microns thick, is used as the substrate. A phosphor coating comprising a dispersion of spherical aggregates comprising randomly oriented plate shaped or needle shaped phosphor particles in a suitable solvent and resin, as above, is applied over the titania layer by means of a doctor blade or other drawdown technique or equivalent. In general, the layer of phosphor and resin will be from about 120–150 microns thick. Over this is applied a scuff resistant layer of a suitable scuff resistant resin such as polyvinyl butyral, at a thickness of about 10 microns. The Mylar sheet employed for such X-ray screens is generally about 15 mils thick.

X-ray screens were prepared as above using spherical aggregates of randomly oriented thulium activated lanthanum oxybromide phosphor particles prepared according to the present invention. The aggregates were dispersed in a polyvinyl butyral resin solution. The binder used to prepare the spherical aggregates by the spray drying process was polyvinyl alcohol. Quantum noise measurements were made on X-ray film exposed in a screen-cassette using a uniform flux of 80 KVp X-rays. A rotating microdensitometer measured the degree of quantum noise as variations in film density. Films exposed in cassettes employing screens made with the spherical aggregates of randomly oriented lanthanum oxybromide phosphor particles of the present invention had about 25% less quantum noise than similar screens prepared with the same phosphor, but wherein the phosphor particles were employed in the standard, non-spherulized form and were not in the form of spherical aggregates.

What is claimed is:

1. An spherical aggregate comprising plate shaped phosphor particles, needle shaped phosphor particles, or a mixture thereof, along with a binder material, wherein said phosphor particles have an aspect ratio greater than one to one and are randomly oriented within said aggregate.

2. The aggregate of claim 1 further containing polyhedral shaped phosphor particles.

3. The aggregate of claim 1 wherein said phosphor particles have an aspect ratio greater than about two to one.

4. The aggregate of claim 2 wherein said plate shaped or needle shaped phosphor particles have an aspect ratio greater than about two to one.

5. The aggregate of claim 3 wherein the aspect ratio of said phosphor particles is greater than about five to one.

6. The aggregate of claim 4 wherein the aspect ratio of said plate shaped or said needle shaped phosphor particles is greater than about five to one.

7. The aggregate of claim 1 wherein said binder material comprises a highly polar, water-soluble polymeric material.

8. The aggregate of claim 1 wherein said binder material is a water-insoluble polymeric material.

9. The aggregate of claim 1 having an average diameter ranging from about 10 to about 70 microns.

10. The aggregate of claim 9 comprising particles of a thulium-activated, lanthanum oxybromide phosphor.

11. The spherical aggregate of claim 1 consisting essentially of said plate shaped or needle shaped phosphor particles or mixture thereof.

12. A process for producing spherical aggregates comprising plate shaped or needle shaped phosphor particles or mixture thereof, along with a suitable binder material, wherein said phosphor particles have an aspect ratio greater than one to one and are randomly oriented with said aggregate, said process comprising the steps of:

(i) forming a dispersion or slurry of said individual, non-aggregated phosphor particles in a suitable liquid medium containing a binder material, and (ii) spray drying said slurry under conditions suitable to evaporate said liquid medium to form said spherical aggregates of said phosphor particles.

13. The process of claim 12 wherein said phosphor particles have an aspect ratio greater than about two to one.

14. The process of claim 13 wherein said aspect ratio is greater than about five to one.

15. The process of claim 12 wherein said liquid medium of said phosphor slurry which is evaporated comprises water or water miscible liquid.

16. The process of claim 14 wherein said liquid medium employed in forming said slurry which is spray dried comprises a water immiscible liquid.

17. An X-ray screen comprising a substrate which supports a layer of phosphor material comprising spherical aggregates of a binder material and phosphor particles having plate or needle shapes, or mixture thereof, randomly oriented within said aggregate and having an aspect ratio greater than one to one.

18. The X-ray screen of claim 17 wherein the aspect ratio of said phosphor particles is greater than about two to one.

19. The X-ray screen of claim 18 wherein said aspect ratio is greater than about five to one.

20. The X-ray screen of claim 17 wherein said phosphor layer also contains non-aggregated phosphor material mixed with said spherical aggregates.

21. The screen of claim 19 additionally containing a layer of phosphor material which is not in the form of said spherical aggregates.

22. A thermoluminescent X-ray screen comprising at least one thermoluminescent phosphor deposited on a physical support capable of recording and storing a radiographic latent image which may be recalled as a light image by using a laser beam or other suitable energy source, wherein said phosphor comprises spherical aggregates of phosphor particles having plate or needle shapes, or mixture thereof, randomly oriented within said aggregates and having an aspect ratio greater than one to one.

23. The screen of claim 22 wherein said aspect ratio of said phosphor particles is greater than about two to one.

24. The screen of claim 23 wherein said aspect ratio of said phosphor particles is greater than about five to one.

25. The aggregate of claim 11 wherein said aspect ratio is greater than about two to one.

26. The aggregate of claim 25 wherein said aspect ratio is greater than about five to one.

* * * * *